United States Patent [19]

Barratt

[11] 4,163,913
[45] Aug. 7, 1979

[54] MOTOR PROTECTOR MOUNT

[75] Inventor: Thomas R. Barratt, Bristol, Tenn.

[73] Assignee: Sundstrand Corporation, Rockford, Ill.

[21] Appl. No.: 857,401

[22] Filed: Dec. 5, 1977

[51] Int. Cl.² ............................................. H02K 5/00
[52] U.S. Cl. .................... 310/91; 310/68 C;
248/300; 428/126; 428/131
[58] Field of Search ...................... 310/68 R, 68 C, 91;
248/300; 428/81, 83, 121, 122, 124, 126,
130–136, 542

[56] References Cited
U.S. PATENT DOCUMENTS

| | | | |
|---|---|---|---|
| 2,651,748 | 9/1953 | Talmadge et al. | 310/68 C |
| 3,312,444 | 4/1967 | Sena | 248/300 |
| 3,532,310 | 10/1970 | Finfrock | 248/300 |
| 4,012,021 | 3/1977 | Duceppe | 310/91 |
| 4,061,935 | 12/1977 | Kandpal | 310/68 C |
| 4,062,511 | 12/1977 | Ray | 248/300 |

*Primary Examiner*—William J. Van Balen
*Attorney, Agent, or Firm*—Wegner, Stellman, McCord, Wiles & Wood

[57] ABSTRACT

A motor protector mount formed from a preformed blank of insulation material and having a base with a pair of spaced-apart tabs extending therefrom and with each of the tabs having openings to receive a part of the motor protector for capture of the motor protector to the mount and with the mount having an opening to receive a tie strap for assembling the motor protector mount to the stator coil of a motor.

12 Claims, 5 Drawing Figures

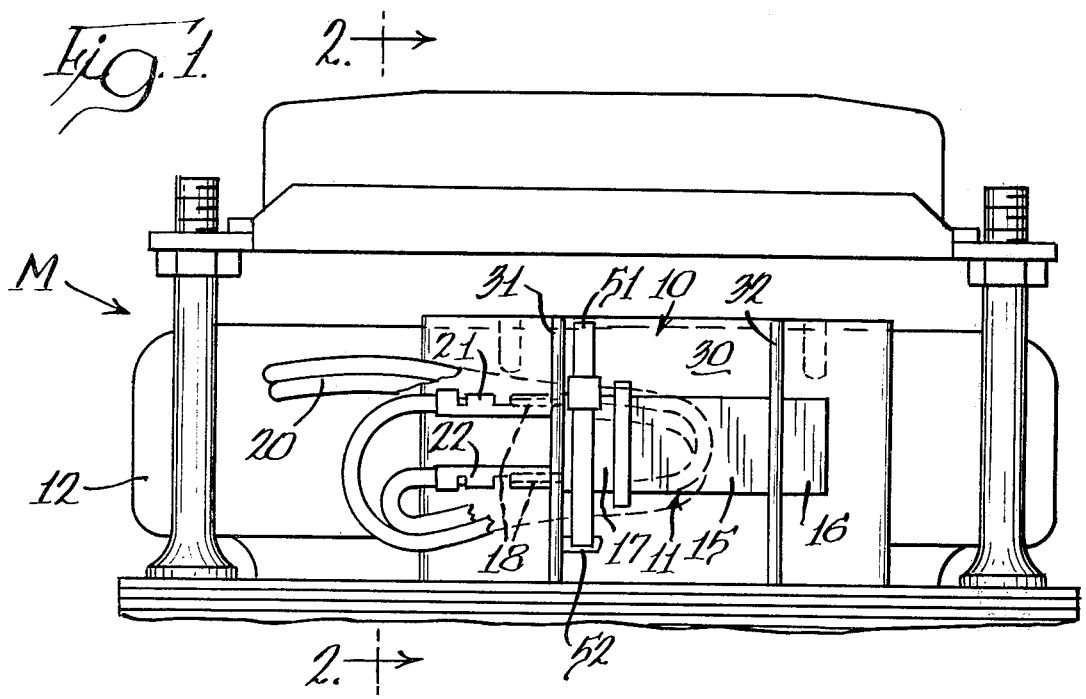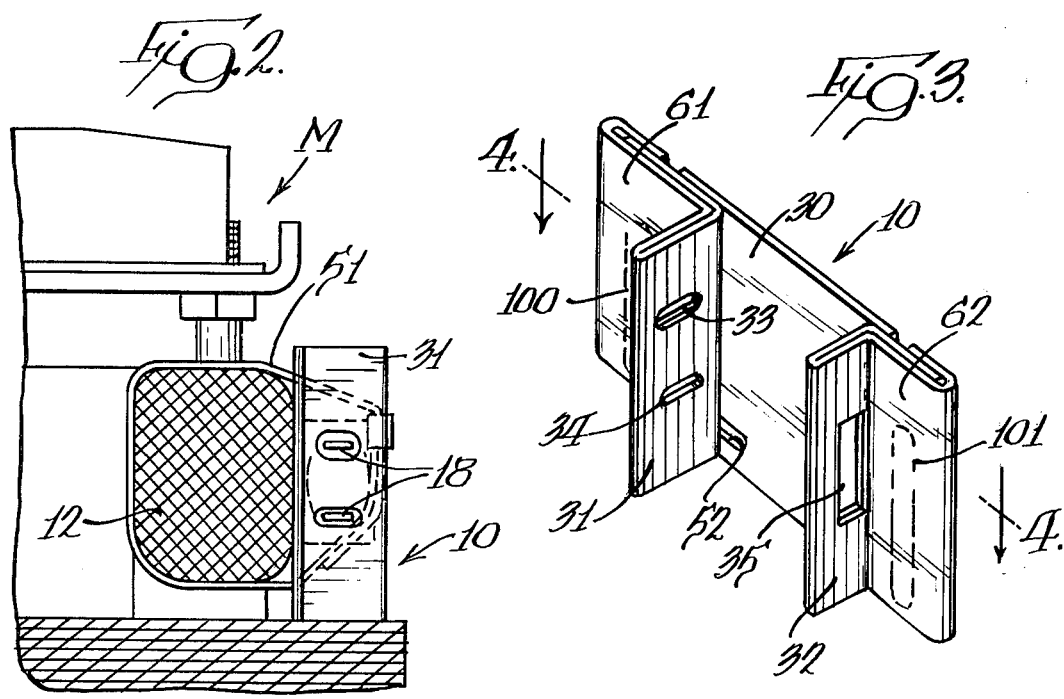

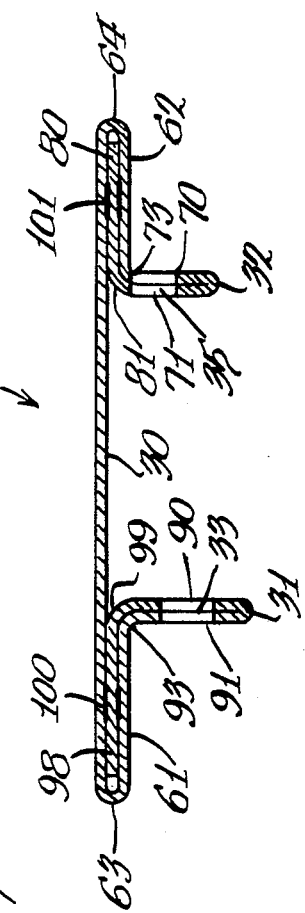
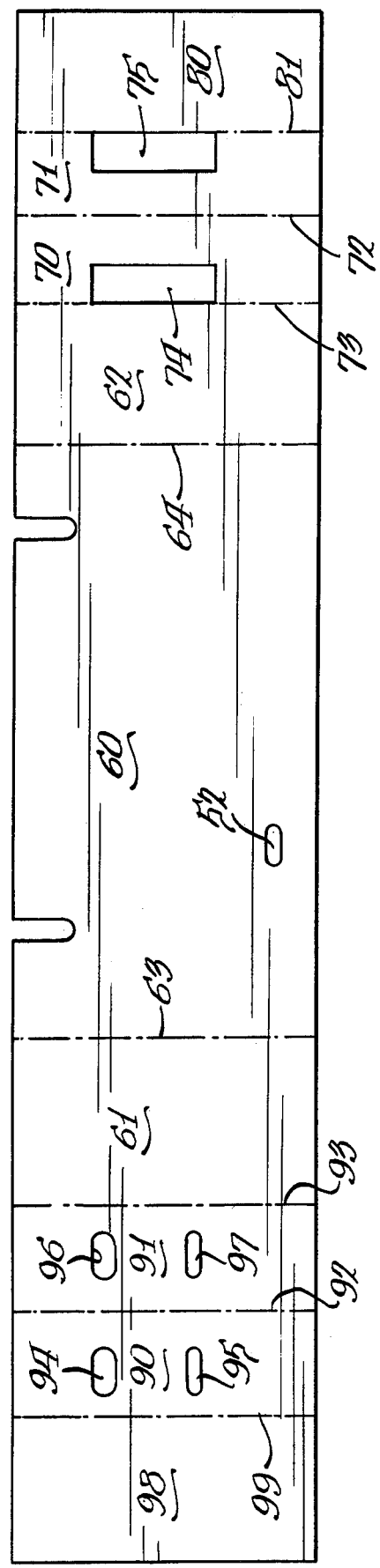

MOTOR PROTECTOR MOUNT

BACKGROUND OF THE INVENTION

This invention pertains to a motor protector mount providing for rapid assembly of a motor protector thereto with the motor protector captured and with rapid assembly to the stator end coil of a motor with improved position tolerance.

It is known to use hermetic motors for operation of compressors and to associate a motor protector therewith. The motor protector may be sensitive to either motor heat or current or both. It is known to mount such a motor protector in heat conductive relation with a stator, as shown in Comstock et al U.S. Pat. No. 3,233,822. The prior art has not had a motor protector mount enabling rapid mounting of a motor protector thereto and the assembly to an end coil of the motor with improved position tolerance.

SUMMARY OF THE INVENTION

A primary feature of the invention disclosed herein is to provide a motor protector mount which securely holds a motor protector thereto with easy rapid assembly of the motor protector to the mount and which enables subsequent secure assembly to a component of the motor.

An object of the invention is to provide a motor protector mount having a base of insulation material and a pair of spaced-apart tabs extending outwardly from the base and having openings to receive parts of the motor protector in captured relation.

Another object of the invention is to provide a motor protector mount, as defined in the preceding paragraph, wherein the mount is formed from a preformed blank of insulating material by folding of the blank along fold lines provided therein and sealing adjacent parts of the blank to each other to hold the tabs in position relative to said base.

Still another object of the invention is to provide a motor protector mount for support of a motor protector relative to a motor comprising a base of insulation material with a pair of spaced-apart tabs extending upwardly from the base with an opening in one of the tabs to slidably receive and capture the body of the motor protector and a pair of openings in the other tab to receive and capture the terminal prongs of the motor protector. The terminal prongs are positioned clear of the tab to enable engagement with lead wire terminals which also lock the motor protector against releasing movement from said mount.

An additional object of the invention is to provide for utilization of a single tie strap for securing the mount with a motor protector associated therewith to a component of a motor, with an opening in the base of the mount to receive said tie strap and said opening being in a position whereby the tie strap also extends around a folded-up section of the lead wire.

BRIEF DESCRIPTION OF THE DRAWINGS

FIG. 1 is a fragmentary elevational view of a motor showing the motor protector mount associated therewith;

FIG. 2 is a vertical section, taken along the line 2—2 in FIG. 1 and with the lead wires omitted;

FIG. 3 is a perspective view of the motor protector mount;

FIG. 4 is a sectional view, taken generally along the line 4—4 in FIG. 3; and

FIG. 5 is a plan view of the preformed blank for the motor protector mount.

DESCRIPTION OF THE PREFERRED EMBODIMENT

The motor protector mount is indicated generally at 10, and is provided for mounting a motor protector, indicated generally at 11, to a part, such as a stator coil 12, of an electric motor M. The motor protector 11 has a body with a primary section 15 integral with a thinner end section 16 and an opposite end section 17 has a pair of terminal prongs 18 extending therefrom. The terminal prongs 18 are connected to lead wires 20 by lead wire terminals 21 and 22 placeable on the terminal prongs 18. As known in the art, the motor protector is mounted in circuit with motor components and may be sensitive to either current flow or temperature to open the motor circuit when required.

The motor protector mount has a generally rectangular base 30 with a pair of spaced-apart tabs 31 and 32 extending outwardly therefrom. Means defining openings are provided in the tabs 31 and 32 including a pair of slots 33 and 34 in the tab 31 which are the size to receive the terminal prongs 18. The tab 32 has a generally rectangular opening 35 to receive the body of the motor protector with the size of the opening 35 being in correspondence to the dimensions of the end section 16 and being slightly smaller than the dimensions of the primary section 15. In assembly of a motor protector 11 to the mount 10, the tabs are flexible relative to the base 30 whereby the motor protector may be slidably inserted into the opening 35 in the tab 32. Thereafter, the tab 31 is flexed away from the tab 32 a distance sufficient to permit insertion of the terminal prongs 18 within the slots 33 and 34 of the tab 31. This results in the motor protector 11 being captured by the tabs 31 and 32 of the mount. The lead wire terminals 21 and 22 may then be placed on the terminal prongs 18 with the result that the motor protector is locked to the mount.

The motor protector and mount are placed in position against the stator coil 12 of the motor M prior to association of the lead wire with the motor protector. After the mounting against the stator coil, the lead wire is then attached to the motor protector. A tie strap 51 is placed in position surrounding the stator coil and the motor protector to hold the parts in assembled relation. This tie strap is an elongate member with an opening provided at one end for receiving the other end whereby, after placement, the free end may be inserted through the opening and locked in position with an excess of the free end being cut off. Prior to tightening of the tie strap, the lead wires may be folded over the protector in a position to be captured by the tie strap, as shown by broken line in FIG. 1. The tie strap 51 is securely attached to the mount by passing through an opening 52 provided in the mount base 30.

The motor protector mount is formed from insulating material and in a preferred embodiment this material is a multi-layer sheet of material having outer layers of "Dacron", a condensation of dimethyl terephthalate and ethylene glycol, with an intermediate layer of "Mylar", a polyethylene terephthalate resin. The mount is made from a preformed blank of material, with the blank being shown in FIG. 5. A central section 60 of the blank is provided with the tie strap receiving opening 52. First and second fold-over flaps 61 and 62 are perforately connected to opposite ends of the central section 60, as indicated by fold lines 63 and 64, respectively. A first pair of tab flaps 70 and 71 are perforately connected to each other on a fold line 72, with the tab flap 70 being perforately connected to the fold-over flap 62 along a fold line 73. Each of the tab flaps 70 and 71 have a generally rectangular opening 74 and 75, respectively, which form the mount opening 35. A fold-under flap 80 is perforately connected to the tab flap 71 along a fold line 81. A second pair of tab flaps 90 and 91 are perforately connected to each other along a fold line 92, with the tab flap 91 being perforately connected to the fold-over flap 61 along a fold line 93. The tab flaps 90 and 91 each have a pair of openings 94, 95, 96 and 97, with the openings 94 and 96 forming the terminal prong-receiving opening 33 and the openings 95 and 97 forming the terminal prong-receiving opening 34. A fold-under flap 98 is perforately connected to the tab flap 90 along a fold line 99.

In forming the mount from the preformed blank, the flaps are folded inwardly about the fold lines 63 and 64 and with there being an additional fold along the fold lines 72 and 92 to place the fold-under flaps 80 and 98, respectively, beneath the fold-over flaps 61 and 62. At this point in the assembly, the tab flaps extend in a generally flat, parallel relation with the central section 60. The initial fold results in the fold-over flaps 62 and 98 overlying the central section 30, with the fold-under flaps 80 and 98 being captured therebetween. This multiple flap assembly is then secured in fixed relation either by application of adhesive or by ultrasonic welding with areas of bonding being indicated at 100 and 101. The tabs are then moved to the outwardly extending position by movement of tab 31 about fold lines 93 and 99 and tab 32 about fold lines 73 and 81.

The location of the tie strap-receiving opening 52 may be varied, depending upon the desired location of mounting of the motor protector mount to the motor.

With the motor protector mount disclosed herein, it will be seen that the mount is a simply-formed structure formed from a preformed blank of insulating material. The motor protector can be rapidly associated therewith and retained in captured position on the mount and with the motor protector and mount easily associated with the motor in a desired position. The motor protector is tightly held to the stator coil head and properly insulated therefrom and is restricted against movement.

I claim:

1. A motor protector mount for a motor protector having a body with a central primary section, a thinner end section and a pair of terminal prongs at the opposite end comprising, a base of insulation material, a pair of spaced-apart tabs extending outwardly from said base and spaced apart a distance less than the length of the motor protector, and means defining openings in said tabs with an opening in one tab being of a size to receive said thinner end section but not said central primary section to permit extension of the end section beyond said one tab and a pair of openings in the other tab to permit extension of said terminal prongs therethrough for engagement with lead wire terminals.

2. A mount as defined in claim 1 wherein said base has an additional opening to receive a tie strap.

3. A mount as defined in claim 2 wherein said additional opening is positioned adjacent the tab which holds the terminal prongs to enable said tie strap to capture a folded length of lead wires.

4. A mount as defined in claim 1 wherein said base and tabs are formed by folding of a preformed blank, and sealing means holding the base and tabs in formed position.

5. A mount as defined in claim 4 wherein said blank is formed of a multi-layer material.

6. A preformed blank of insulating material for subsequent folding and sealing into a motor protector mount, said blank having a central section, first and second fold-over flaps with one of said flaps perforately connected to each end of the central section, a first pair of tab flaps perforately interconnected with one tab flap perforately connected to the first fold-over flap and said first pair of tab flaps each having a motor protector body receiving opening therein, and a second pair of tab flaps perforately interconnected with one of the last-mentioned tab flaps perforately connected to the second fold-over flap and said second pair of tab flaps each having a pair of motor protector terminal prong openings.

7. A blank of material as defined in claim 6 wherein said material is heat sealable.

8. A blank of material as defined in claim 6 wherein said blank has a pair of fold-under flaps perforately connected one to each of a tab flap of the first and second pair of tab flaps, and an opening in said central section to receive a tie strap.

9. A motor protector mount for support of a motor protector relative to the motor comprising, a base of insulation material, a pair of spaced-apart tabs flexible relative to the base and extending upwardly therefrom and in spaced-apart relation, an opening in one of said tabs to slidably receive and capture the body of the motor protector, and a pair of openings in the other tab to receive and capture the terminal prongs of the motor protector with the ends of the terminal prongs extending from the other tab for engagement with lead wire terminals to lock the motor protector to said mount.

10. A mount as defined in claim 9 wherein said mount is an integral structure with said base and tabs being formed from a preformed blank by folding of the blank, and seal means to hold the folded blank in assembled relation.

11. A mount as defined in claim 10 wherein said tab openings completely surround the part of the motor protector received therein, and an opening in said base to receive a tie strap.

12. A mount as defined in claim 11 wherein said tabs are spaced apart a distance less than the length of a motor protector and are flexible relative to the base.

* * * * *